Patented Oct. 5, 1954

2,691,045

UNITED STATES PATENT OFFICE 2,691,045

PRODUCTION OF OXYGENATED COMPOUNDS EMPLOYING SULFACTIVE CATALYST

Hugh J. Hagemeyer, Jr., Kingsport, Tenn., assignor to Eastman Kodak Company, Rochester, N. Y., a corporation of New Jersey No Drawing. Application April 29, 1948, Serial No. 24,095

6 Claims. (Cl. 260—597)

This invention relates to the production of oxygenated organic compounds such as aldehydes, ketones, alcohols, and the like. More particularly this invention is concerned with the production of carbonyl compounds such as propionaldehyde and butyraldehyde by a process involving the reaction of an olefin with a source of carbon monoxide and hydrogen in the presence of a sulfactive catalyst.

There are a number of publications and patents outstanding which describe the reaction of various types of olefins, both aliphatic and cyclic with carbon monoxide and hydrogen and other components in the presence of various catalysts but not catalysts comparable to the catalysts of the present invention. In many of the processes of the prior art the reaction proceeded to acid formation rather than the production of compounds such as aldehydes and ketones. It is apparent, however, from the prior art that various olefinic compounds, or similar type compounds containing a double bond, may be caused to react with carbon monoxide and hydrogen. The most interesting prior art of which I am aware is certain foreign description concerning a German process for reacting olefins with water gas. This reaction was carried out in the presence of a solid catalyst comprised of cobalt, thoria, magnesia, and kieselguhr in toluene as a diluent. That is, it appears that the so-called Fisher-Tropsch type of catalyst was used.

A typical catalyst is composed of 36 percent cobalt, 2 percent thoria and 2 percent magnesium oxide suspended on kieselguhr which is obtained by reduction of the oxide-kieselguhr combination in a stream of hydrogen at 380–400° C. This catalyst is very effective under ideal conditions, but it is readily poisoned and its catalytic activity stopped by traces of oxygen, sulfur, hydrogen sulfide and water. In commercial operation it is difficult to exclude any or all of these poisons completely from the reactor.

I have found that sulfactive or sulfur-containing catalysts can be prepared which are not affected by traces of oxygen, sulfur, or hydrogen sulfide and are relatively resistant to the negative effects of large amounts of water. In addition the sulfactive catalysts are preferred because sulfur and sulfur-containing compounds are known promoters for carbonyl catalyses and carbonylation reactions. The use of a sulfactive catalyst also permits the use of crude water gas without purification to remove sulfur and hydrogen sulfide.

This invention has for an object to provide an improved method for the manufacture of oxygenated organic compounds. A further object is to provide a process for the manufacture of carbonyl compounds such as lower aliphatic aldehydes and ketones from feed material comprising an organic compound which contains a double bond reacted with commercial sources of carbon monoxide and hydrogen. A particular object is to provide a method of manufacturing oxygenated substances from olefinic materials reacted with carbon monoxide and hydrogen in the presence of a sulfactive catalyst. Another object is to provide a novel catalyst that is relatively inexpensive, highly active, poison-resistant and non-corroding. Another object is to provide a method for manufacturing propionaldehyde and butyraldehyde from olefins reacted with ordinary water gas. Other objects will appear hereinafter.

As discussed above, many of the prior art types of catalysts comprised base metals, with or without various promoters, and were susceptible to poisoning. While it is not desired to be bound by any particular theory of operation respecting catalytic processes of the class described, it has been found that sulphurization of the catalyst, as set forth herein, is beneficial.

A general understanding of the mechanism of reactions of the class described, as well as a further understanding of the instant invention, will be had from the following general considerations.

The reaction of olefins with carbon monoxide and hydrogen can be represented by the fundamental equations:

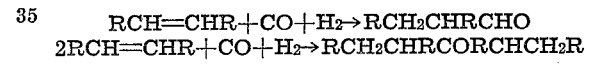

wherein R is hydrogen, alkyl aryl, or other organic residue.

Gaseous, liquid, or solid olefin hydrocarbons such as ethylene, propylene, butylene, butadiene and higher homologs may be employed. With olefins above ethylene a mixture of isomeric aldehydes are produced and, for example, with propylene approximately a 50:50 mixture of normal and isobutyraldehyde is produced. Reaction products have been obtained in which the aldehyde fraction constituted as much as ninety percent of the product by weight, although the aldehyde fraction generally averages about seventy percent with the residue consisting of alcohols and ketones.

Other unsaturated compounds which may be employed include cyclo-olefins or unsaturated naphthenes or mixed aliphatic hydrocarbons, i. e.

aliphatic hydrocarbons which contain aromatic radicals, for instance styrene, or hydrocarbons of the terpene series such as limonene or pinene, or products of substitution of these unsaturated hydrocarbons, for instance unsaturated alcohols, aldehydes, acids or halogen derivatives which by condensation with carbon monoxide and hydrogen are converted, respectively, into keto alcohols, or oxy aldehydes or diketones or ketoaldehydes or dialdehydes or diketones or ketonic acids, or haloaldehydes, ketones or acids. Vinyl esters can be employed to form acyloxy aldehydes and alpha beta unsaturated aldehydes.

Ethylene, propylene, butylene, styrene, allyl alcohol, crotonaldehyde, butadiene, mesityl oxide, vinyl acetate, isopropenyl acetate, cinnamic aldehyde, and stilbene are representative of the compounds which may be employed as the olefin in this process. With vinyl acetate the reaction can be represented by the equation:

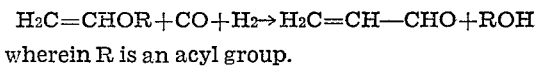

wherein R is an acyl group.

The above description has been directed to the broader aspects of carrying out the reaction of olefins with carbon monoxide and hydrogen. As already mentioned, in some instances, such as, for example, where the source of carbon monoxide and hydrogen might be from crude water gas and a poison-resistant, non-corroding type of catalyst is desired, I have found that the catalyst of the present invention, which I describe as a sulfactive catalyst, may advantageously be employed.

This sulfactive species of catalysts may be prepared by a variety of methods and in general any suitable hydrogenation catalyst can be treated with sulfur and/or hydrogen sulfide to form a sulfactive material, although certain preferred methods are described below. Sulfactive catalysts can also be prepared by the reduction of oxides or hydroxides of metals of the eighth group with hydrogen sulfide or a mixture of hydrogen and hydrogen sulfide, although in general it is preferred to carry out the sulphurizing or sulfiding treatment on the reduced catalyst at moderate temperatures, 20–80° C.

Sulphurization of a reduced catalyst is conveniently carried out by treating a reduced hydrogenation catalyst with a saturated solution of sulfur in an organic solvent such as benzene, toluene, dioxane, carbon disulfide, etc.

A second method of preparing a sulfactive catalyst is to pass hydrogen sulfide into a suspension of an active hydrogenation catalyst in an inert organic solvent until the evolution of hydrogen ceases. Other methods of producing sulfide hydrogenation catalysts are known to the art and I have found them to be generally applicable to the process of the present invention. Sulfactive catalysts can also be prepared by reduction of the oxides and hydroxides of metals of the eighth group of the periodic table in a stream of hydrogen sulfide or a hydrogen sulfide or a hydrogen-hydrogen sulfide mixed gas at 200–400° C. Another method is the precipitation of the metal sulfides from solution in the presence of elemental sulfur. This latter catalyst can be treated with hydrogen at elevated temperatures to eliminate part of the sulfur as hydrogen sulfide and thus form a material with an extended surface.

The catalysts may be employed in solid form and in a finely divided state arranged on carriers, such as kieselguhr, and the compounds to be reacted in this case are passed over the catalyst in the form of gases or vapors similar to the methods already described. It is also possible to suspend the catalysts in a liquid medium in an inert liquor medium, such as saturated paraffin, benzene, diesel oil, or in the liquid unsaturated compound to be reacted and to contact under increased pressure the gas, or gas mixture which contains the carbon monoxide, with this suspension of the catalyst.

The term sulfactive catalyst used herein refers to catalysts of the type described above and also to be described in further detail in the examples. In general, these catalysts are essentially comprised of metal from the eighth group of periodic system, such as cobalt, and which have been treated to incorporate a content of sulfur or selenium in the catalyst.

The preferred reaction temperature varies with the particular catalyst and in general a temperature slightly above the threshold temperature is preferred for the preparation of carbonyl compounds, aldehydes and ketones. At higher temperatures the alcohols are formed in increasing amounts. With cobalt catalysts the threshold temperature is approximately 90–100° C. and the optimum reaction temperature for carbonyl compounds is 140±5° C. With iron, temperatures of 180±5° C. are preferred. Temperatures up to 250° C. may be employed in the production of alcohols. Other factors affecting the formation of alcohols include: the excess of hydrogen present, the time of reaction; and, the nature of the specific unsaturated compound treated. Pressures between 40–400 atmspheres are desirable.

Typical sulfactive catalysts and catalyst treatments are described in the following examples:

*Example I*

100 grams of commercially obtainable ⅛ in. pellets, were reduced in a stream of hydrogen at 400° C. to give a material with a composition, 36 percent cobalt, 2 percent thoria, 2 percent magnesium oxide on 60 percent kieselguhr. The reduced catalyst was treated twice with a saturated solution of sulfur in benzene at 50° C.

The catalyst was washed with benzene and with lubricating oil to remove any loose sulfur particles. Twelve grams of sulfur remained in the catalyst which was charged to the autoclave as a suspension in 200 cc. of lubricating oil. The rocking autoclave was charged with 1:1:1 molar ratio of commercial grades of ethylene, carbon monoxide and hydrogen. A reaction temperature of 130±5° C. was maintained at 2,200–3,500 p. s. i. with an average reaction velocity of 23 minutes per gram mole. Distillation of the product gave 46 percent propionaldehyde, 23 percent n-propyl alcohol, 19 percent diethyl ketone and the remainder was high boiling aldehyde condensation products.

*Example II*

Approximately 100 grams of commercially obtained catalyst, ⅛ in. pellets, as above described, was reduced at 300° C. in a stream of hydrogen. The catalyst was cooled in the hydrogen atmosphere and immersed in ethanol. Hydrogen sulfide was bubbled in at 50–60° C. until no more hydrogen was liberated.

The catalyst was washed twice with ethanol and suspended in 100 grams of high boiling ketonic material from previous propylene runs. Commercial grades of propylene, carbon monoxide, and hydrogen were reacted in a 1:1:1 ratio at 150±10° C. and 2,100–4,000 pounds with a reaction velocity of eight minutes per gram mole. The autoclave was blown off hot and the product condensed. Distillation gave a 62 percent yield of a 75:25 mixture of normal and isobutyraldehyde. No evidence of poisoning was observed.

Example III

The catalyst used in Example I was charged to an autoclave as a suspension in butanol. Five gram moles of ethylene were reacted with synthesis gas produced by the gasification of coke and analyzing: 38 percent cobalt, 54 percent hydrogen, 0.1 percent carbon dioxide, 7.9 percent nitrogen, and 201 grains of sulfur per 100 cubic feet. The reaction was carried out at 2,700–3,500 p. s. i. and 140±5° C. with a reaction time of 14 minutes per gram mole. The product was blown off and distilled to give a 74 percent yield of propionaldehyde.

Example IV

The catalyst used in Example II and suspended in a mixture of dipropyl ketones was charged to the rocking autoclave. 224 grams of propylene was charged to the reactor and reacted with synthesis gas of the same composition as used in Example III. The reaction was conducted at 140±10° C. and 2,000–3,400 p. s. i. with an average reaction velocity of 11 minutes per gram mole of propylene. Distillation of the reaction product gave an 86 yield of a 78:22 mixture of normal and isobutyraldehydes.

From the foregoing description it is believed that it will be seen wherein an improved process over the prior art has been set forth. While my process requires a source of olefin, carbon monoxide, and hydrogen, any incidental oxygen, sulfur, hydrogen sulfide and the like present in commercial gases does not kill the process.

Selenium, hydrogen selenide and the metal selenides of cobalt, iron, and nickel can be substituted for the sulfur or sulfur derivative. It has also been noted that the presence of another metal, copper especially, is advantageous, in conformity with the high pressure synthesis of the metal carbonyls from halides as discussed in the prior art.

In the Oxo type process the catalyst in addition to functioning as a hydrogenation catalyst must also act as a carbon monoxide transfer, and/or addition agent. The sulfur-containing compositions or sulfides are advantageous for the reasons explained above. The catalysts of the present invention are a contradiction of the prior art which teaches that sulfur and hydrogen sulfide can only poison the catalyst materials, whereas I have found that sulfactive catalysts are superior to the prior art catalysts described for this process.

As already discussed, in many instances the elevated temperatures and pressures used will be within the range of 100° C.–140° C. and 600–6,000 pounds per sq. in., and I have found that for at least a part of the time it is desirable to keep the pressure toward the upper part of the range. That is, by operating in the vicinity of 3,000–3,500 p. s. i. the reaction rate can be increased. My process is strongly exothermic and does not require, excepting incidentally, at the starting to bring the reactants to temperature, the supplying of heat. As readily apparent to those skilled in the art, suitable provision will be made for removing heat from the process by means of cooling coils, jacketing, and the like to maintain the temperatures and pressures within the range indicated. The use of automatic controls and other expedients known in the art for facilitating the carrying out of continuous processes is contemplated, as are other usual expedients.

What I claim as my invention and desire to be protected by Letters Patent of the United States is:

1. In a catalytic process for production of carbonyl compounds such as aliphatic aldehydes and ketones by the reaction at 50–250° C. and 40–400 atm. of 2–4 carbon olefins, carbon monoxide and hydrogen, wherein the catalyst activity is adversely affected by the presence of impurities such as oxygen, the improvement which comprises reducing the adverse effects of such impurities by carrying out the reaction in the presence of a sulfactive reduced cobalt catalyst suspended in butanol, said reduced cobalt having been sulfurized, after having been reduced and suspended in the butanol and prior to being contacted with the olefin, carbon monoxide and hydrogen reactants, by contact with a sulfur-containing material selected from the group consisting of sulfur-containing gas and sulfur dissolved in an inert organic solvent.

2. The improvement described in claim 1, wherein the sulfur-containing material is a solution of sulfur in benzene.

3. The improvement described in claim 1, wherein the sulfur-containing material is hydrogen sulfide gas.

4. In a catalytic process for production of carbonyl compounds such as aliphatic aldehydes and ketones by the reaction at 50–250° C. and 40–400 atm. of 2–4 carbon olefins, carbon monoxide and hydrogen, wherein the catalyst activity is adversely affected by the presence of impurities such as oxygen, the improvement which comprises reducing the adverse effects of such impurities by carrying out the reaction in the presence of a sulfactive reduced cobalt catalyst suspended in a lower aliphatic alcohol, said reduced cobalt having been sulfurized, after having been reduced and suspended in said alcohol and prior to being contacted with the olefin, carbon monoxide and hydrogen reactants, by contact with a sulfur-containing material selected from the group consisting of sulfur-containing gas and sulfur dissolved in an inert organic solvent.

5. The improvement described in claim 4 wherein the sulfur-containing material is a solution of sulfur in benzene.

6. The improvement described in claim 4 wherein the sulfur-containing material is hydrogen sulfide gas.

References Cited in the file of this patent

UNITED STATES PATENTS

| Number | Name | Date |
| --- | --- | --- |
| 1,852,988 | Varga | Apr. 5, 1932 |
| 2,238,851 | Pier | Apr. 15, 1941 |
| 2,327,066 | Roelen | Aug. 17, 1943 |
| 2,356,711 | Szayna | Aug. 22, 1944 |
| 2,402,626 | Howk | June 25, 1946 |
| 2,402,683 | Signaigo | June 25, 1946 |
| 2,435,380 | Archibald et al. | Feb. 3, 1948 |
| 2,473,995 | Gresham et al. | June 21, 1949 |
| 2,488,145 | Smith et al. | Nov. 15, 1949 |
| 2,491,915 | Barrick et al. | Dec. 20, 1949 |
| 2,517,383 | Brooks | Aug. 1, 1950 |
| 2,549,111 | Millendorf et al. | Apr. 17, 1951 |
| 2,595,772 | Daussat et al. | May 6, 1952 |

(Other references on following page)

OTHER REFERENCES

I. G. Farben German patent application, I70,739IVd/120, O. Z. 13,059. T. O. M. Reel 36, Item 21 and part of Item 36, deposited in Library of Congress on March 12, 1946. Also available in "Oxo Process" translation of these applications by the Charles A. Meyer & Co., Inc., New York (pages 28 to 30).

I. G. Farben German patent application, I71,966IVd/120, O. Z. 13,366. T. O. M. Reel 36, Item 21 and part of Item 36. Pages 35 to 37 in the Meyer translation.

U. S. Naval Technical Mission in Europe, Technical Report No. 248–45, August 2, 1946, pages 118–119.

U. S. Naval Technical Mission in Europe, Technical Report No. 248–45, August 2, 1946, page 122.

FIAT Final Report No. 1000, OMGUS, December 26, 1947, pages 16, 28 and 29.

Wender et al.: "Critical Review of Chemistry of Oxo Synthesis for Production of Alcohols from Olefins, Carbon Monoxide, and Hydrogen," R. I. 4270, Dept. of Interior, Bur. of Mines (June 1948), pages 6–7.